(12) United States Patent
Abouelleil et al.

(10) Patent No.: US 10,408,355 B2
(45) Date of Patent: Sep. 10, 2019

(54) PRESSURE ACTIVATED VALVE SEAT

(71) Applicant: Mueller International, LLC, Atlanta, GA (US)

(72) Inventors: Ashraf Abouelleil, Oswego, IL (US); Steve Sharp, Naperville, IL (US); Julian Ramirez, Aurora, IL (US)

(73) Assignee: Mueller International, LLC, Atlanta, GA (US)

( * ) Notice: Subject to any disclaimer, the term of this patent is extended or adjusted under 35 U.S.C. 154(b) by 23 days.

(21) Appl. No.: 15/800,892

(22) Filed: Nov. 1, 2017

(65) Prior Publication Data

US 2019/0128426 A1    May 2, 2019

(51) Int. Cl.
| | |
|---|---|
| *F16K 1/42* | (2006.01) |
| *F16K 25/00* | (2006.01) |
| *F16K 1/226* | (2006.01) |
| *F16K 1/22* | (2006.01) |

(52) U.S. Cl.
CPC .............. *F16K 1/42* (2013.01); *F16K 1/22* (2013.01); *F16K 1/2265* (2013.01); *F16K 25/00* (2013.01)

(58) Field of Classification Search
CPC ... F16K 1/42; F16K 1/22; F16K 1/226; F16K 1/2263; F16K 1/2265; F16K 1/228; F16K 1/2285; F16K 25/00
See application file for complete search history.

(56) References Cited

U.S. PATENT DOCUMENTS

| | | | | |
|---|---|---|---|---|
| 1,990,309 A | * | 2/1935 | Phillips ................... | F16K 1/228 137/246.22 |
| 2,809,060 A | * | 10/1957 | Thompson ............ | F16K 1/2263 251/306 |
| 2,936,153 A | * | 5/1960 | Gaffin ................... | F16K 1/2263 251/306 |
| 3,048,363 A | * | 8/1962 | Garrigan ............... | F16K 1/2263 251/307 |
| 3,376,015 A | * | 4/1968 | Forsman ............... | F16K 1/2265 251/306 |
| 3,502,299 A | * | 3/1970 | Phillips ................. | F16K 1/2265 251/173 |
| 3,726,503 A | * | 4/1973 | Fawkes ................. | F16K 1/2285 251/173 |

(Continued)

OTHER PUBLICATIONS

Images of a gate valve which was publicly available prior to Nov. 1, 2017, 1 pg.

*Primary Examiner* — Reinaldo Sanchez-Medina
*Assistant Examiner* — David Colon-Morales
(74) *Attorney, Agent, or Firm* — Taylor English Duma LLP (57) ABSTRACT

A valve includes an annular body defining a body bore. An annular valve seat is positioned in the body bore and an annular groove is defined in a portion of the annular sealing surface. A rotatable valve element is positioned in the body bore. With the valve element in a closed and an unpressurized condition, the annular groove is deformed and a first groove gap is defined in the annular groove adjacent to the first disc face and a second groove gap is defined in the annular groove adjacent to the second disc face. With the valve element closed and in a pressurized condition, the annular groove is deformed and a third groove gap is defined in the annular groove adjacent to the first disc face. A volume of the third groove gap is greater than a volume of the first groove gap and second groove gap.

18 Claims, 6 Drawing Sheets

FIG. 4

(56) References Cited

U.S. PATENT DOCUMENTS

| | | | | |
|---|---|---|---|---|
| 3,913,610 | A * | 10/1975 | Paptzun | F16K 1/22 |
| | | | | 137/375 |
| 4,998,708 | A * | 3/1991 | Pavanel | F16K 1/2263 |
| | | | | 251/306 |
| 5,482,252 | A * | 1/1996 | Kamezawa | F16K 1/2265 |
| | | | | 251/305 |
| 5,695,170 | A * | 12/1997 | Dernovsek | F16K 1/2265 |
| | | | | 251/305 |
| 6,206,376 | B1 * | 3/2001 | Hartman | F16J 15/164 |
| | | | | 251/175 |
| 7,357,372 | B2 * | 4/2008 | Shakagori | F16K 1/2265 |
| | | | | 123/337 |
| 7,510,167 | B2 * | 3/2009 | Malki | B29C 70/86 |
| | | | | 251/304 |
| 7,775,505 | B2 * | 8/2010 | Shakagori | F16K 1/2265 |
| | | | | 251/306 |
| 7,946,556 | B1 * | 5/2011 | Trott | F16J 15/104 |
| | | | | 251/175 |
| 8,256,450 | B2 * | 9/2012 | Hansen | F16K 1/2265 |
| | | | | 137/340 |
| 9,903,496 | B2 * | 2/2018 | Abouelleil | F16K 27/0218 |
| 2005/0211937 | A1 * | 9/2005 | Popadiuc | F16K 1/226 |
| | | | | 251/129.06 |
| 2012/0168659 | A1 * | 7/2012 | Ozaki | F16K 1/2265 |
| | | | | 251/306 |
| 2013/0032744 | A1 * | 2/2013 | Duboy | F16K 1/2265 |
| | | | | 251/306 |
| 2014/0203201 | A1 * | 7/2014 | Kinser | F16K 1/2263 |
| | | | | 251/306 |
| 2016/0178067 | A1 * | 6/2016 | Abouelleil | F16K 1/2265 |
| | | | | 251/308 |
| 2017/0234436 | A1 * | 8/2017 | Abouelleil | F16K 1/2263 |
| | | | | 251/306 |
| 2017/0370181 | A1 * | 12/2017 | Savalia | F16K 1/221 |
| 2018/0149278 | A1 * | 5/2018 | Abouelleil | B23P 15/001 |

* cited by examiner

PRESSURE ACTIVATED VALVE SEAT

TECHNICAL FIELD

This disclosure relates to valves. More specifically, this disclosure relates to valves with rotatable discs and valve seats.

BACKGROUND

Valves and valve assemblies can be used for controlling or regulating the flow of a fluid, such as water, oil, or gas, through a passageway such as a piping system. Valves can comprise a valve body which can define a bore, a valve element positioned within the bore, and a valve seat positioned within the valve body. A butterfly valve is a type of valve in which the valve element can be a disc. The valve element can be configured to seal against the valve seat in order to prevent the flow of fluid through the bore when the valve element is in a closed position or to allow the flow of fluid through the bore when the valve element is in a partially-open position or fully open position. The valve element can be actuated about and between the closed position and the open position by applying a torque to a stem connected to the valve element. In the closed position, fluid pressure applied to the valve element can cause the valve element to deflect. This deflection can allow the flow of fluid through the bore when the valve element is in the closed position which can be undesirable in some applications.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a valve comprising an annular body defining a body bore having a bore axis. Also disclosed is an annular valve seat comprises an annular sealing surface that defines a seat bore, wherein an annular groove is defined in the annular sealing surface by a groove wall, and wherein the annular sealing surface is formed from a deformable material. Also disclosed is a valve element positioned in the seat bore and coupled to the annular body, the valve element comprising a rotatable disc configured to rotate about and between a closed position, in which the rotatable disc is configured to prevent fluid from flowing through the seat bore, and an open position, in which the rotatable disc is configured to allow maximum fluid flow through the seat bore, wherein the rotatable disc has a first disc face, and an opposed second disc face, wherein in the open position, the annular groove is in a first, relaxed position, wherein in the closed position and an unpressurized condition, in which fluid pressure exerted on the first face of the rotatable disc is substantially the same as fluid pressure exerted on the second face of the rotatable disc, the annular groove is in a second, deformed position that is different than the first, relaxed position, wherein a first groove gap is defined in the annular groove adjacent to the first disc face and wherein a second groove gap is defined in the annular groove adjacent to the second disc face, wherein in the closed position and a pressurized condition, in which fluid pressure exerted on the first face of the rotatable disc is different than fluid pressure exerted on the second face of the rotatable disc, the annular groove is in a third, deformed position that is different than the second, deformed position and a third groove gap is defined in the annular groove adjacent to the first disc face, wherein a volume of the third groove gap is greater than a volume of the first groove gap of the second, deformed position and wherein the volume of the third groove gap is greater than a volume of the second groove gap of the second, deformed position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such element unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

In one aspect, disclosed is a valve comprising a valve seat and a rotatable valve element. The valve seat comprises an annular sealing surface with an annular groove define therein, and the valve element comprises a rotatable disc having a portion positionable in the annular groove. The annular groove can be sized and shaped so that when the valve is in a pressurized condition such that a fluid (other than ambient air pressure) is exerting pressure on a face of the disc, a side wall of the groove can engage the disc to form a secondary seal between the valve seat and the valve element. It would be understood by one of skill in the art that the disclosed valve is described in but a few exemplary aspects among many. No particular terminology or description should be considered limiting on the disclosure or the scope of any claims issuing therefrom.

Figure 1:
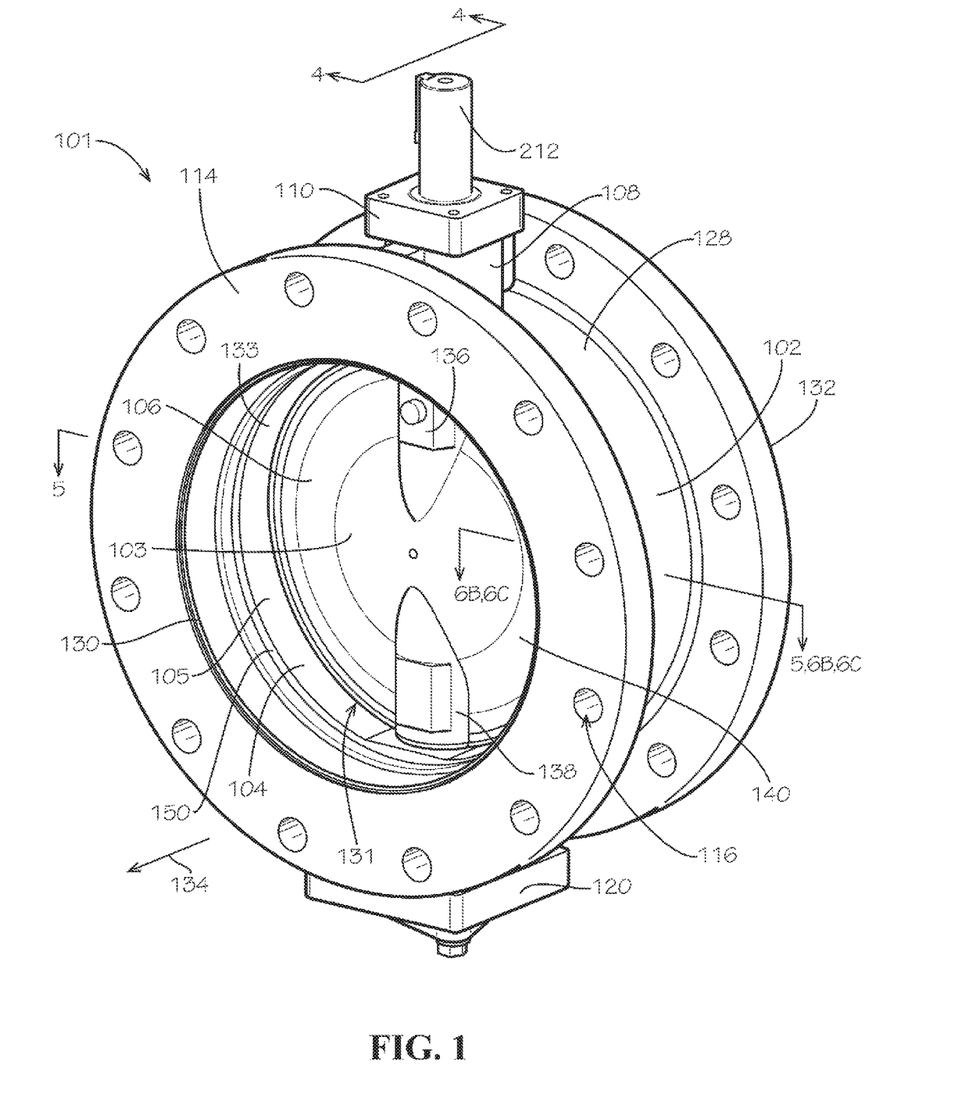
FIG. 1 is a perspective view of a valve with a disc in a closed position in accordance with one aspect of the disclosure.

FIG. 1 shows a perspective view of a valve 101 in accordance with one aspect of the disclosure. The valve can comprise a body 102, a valve seat 104, and a valve element 103. The valve element can be disposed within the valve body 102, and the valve element 103 can be configured to seal against the valve seat 104. The valve element in FIG. 1 is shown in a closed position. In the aspect shown, the valve 101 can be a butterfly valve, and the valve element 103 can be a rotatable disc 106. In various aspects, the disc can be constructed from stainless steel; however, in other aspects, the disc 106 can be made from coated ductile iron, aluminum, bronze, plastic, or any other similar material. Additionally, the disc can comprise any desirable coating such as Nylon 11, nickel-phosphorus or nickel-boron alloy applied through electroless nickel plating (ENP plating), or any other suitable coating.

The body 102 can comprise a one-piece construction made from ductile iron. In other aspects, the body can be made from cast iron, cast bronze, stainless steel, carbon steel, aluminum, plastic, or any other suitable material. Additionally, in various other aspects, the body 102 can comprise a multiple-piece construction with various components attached together to create the body.

In various aspects, the body 102 and the valve seat 104 can each define a substantially annular or tubular shape; however, the body and the valve seat can define other shapes such as a substantially rectangular shape in other aspects. The body 102 can comprise a first body end 130 and a second body end 132 distal from the first body end. The valve seat 104 can comprise a first seat end 150 and a second seat end 352 (shown in FIG. 3) distal from the first seat end. The first seat end 150 can be positioned proximate the first body end 130, and the second seat end can be positioned proximate the second body end 132. In one aspect, the body 102 can define a body bore extending through the body 102 along a bore axis 134 from the first body end 130 to the second body end 132. In another aspect, the valve seat 104 can define a seat bore 131 extending through the valve seat along the bore axis 134.

The valve seat 104 can have an inner seat surface 133 which faces radially inwards towards the valve element 103. The inner seat surface can extend from the first seat end 150 to the second seat end 352. The valve seat can also define an outer seat surface 333 (shown in FIG. 3) opposite from the inner seat surface 133. The outer seat surface faces radially outwards towards an inner body surface 328 (shown in FIG. 4) defined by the body 102. The inner body surface extends from the first body end 130 to the second body end 132. The body 102 defines a body outer surface 128 positioned opposite from the inner body surface 328 which faces outwards from the body 102. The outer seat surface 333 can be positioned in contact with the inner body surface 328 with the valve seat 104 positioned between the body 102 and the valve element 103. The contact between the outer seat surface 333 and the inner body surface 328 can provide a seal between the valve seat 104 and the body 102.

In various aspects, the body 102 can comprise an upper neck 108 extending radially outwards from the body outer surface 128. The body 102 can also comprise a lower neck extending radially outwards from the body outer surface 128. In various aspects, the lower neck extends radially outwards from the body outer surface at a location on the body outer surface 128 opposite from the location of the upper neck 108 on the body outer surface. The upper neck 108 and lower neck can each define a substantially annular or tubular shape with a shaft axis perpendicular to the bore axis 134 of the body 102; however, the upper neck 108 and the lower neck can define other shapes in various other aspects.

In various aspects, a bottom cap 120 can be attached to the lower neck and can seal the lower neck from the outside environment. In some aspects, the upper neck 108 can also comprise a top flange 110. In these aspects, the top flange can be at an end of the upper neck distal from the body outer surface 128. The top flange 110 can provide a location and a mechanism to attach an actuator to the valve 101. In various applications, the actuator can be configured to selectively move the valve element 103 through a range of positions about and between an open position and a closed position. In the closed position shown in FIG. 1, the valve element 103 can be positioned to seal against the valve seat 104 to prevent the flow of fluid through the valve 101. In the open position shown in FIG. 2, the valve element can be positioned to allow maximum flow through the valve 101. In applications in which the valve 101 is used for throttling or flow-control, the valve element 103 can also be positioned in a partially-open position within the range of positions between the open position and the closed position in order to control a flowrate of fluid through the valve.

Figure 2:
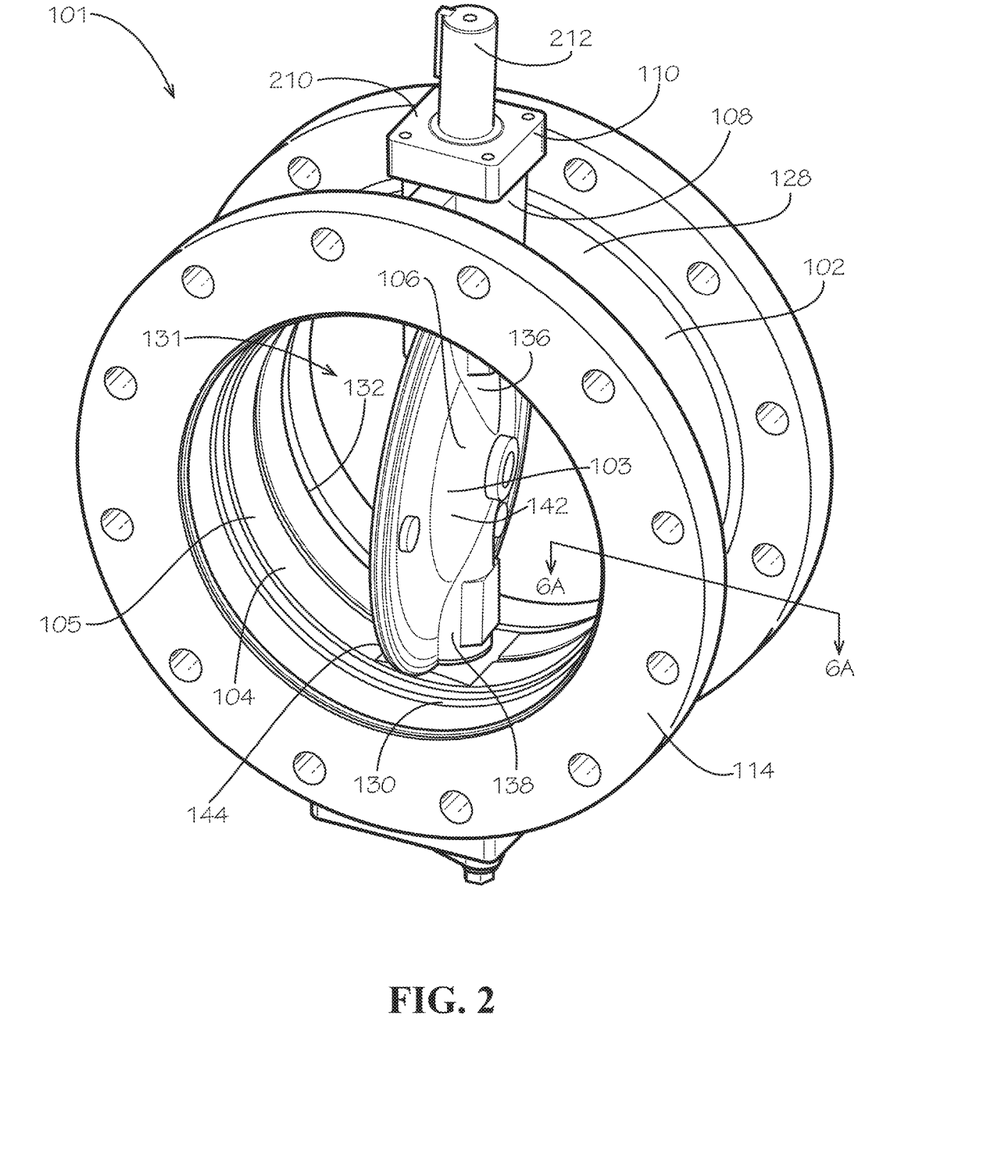
FIG. 2 is a perspective view of the valve of FIG. 1 with the disc in an open position.

In the present aspect, the disc 106 can be rotated about the shaft axis about 90-degrees from the closed position to place the valve 101 in the open position, which is shown in FIG. 2. In the open position, the disc 106 obstructs a minimum portion of the bore 131 possible for a shape and a size of the bore 131 and the disc 106. In some aspects, the valve element 103 can translate between the open position and the closed position rather than rotate.

In various aspects, the actuator can be configured to apply a torque to the valve element 103 to selectively move the valve element through the range of positions about and between the open position and the closed position. For example, a gearbox of the actuator can be secured to the top flange 110 of the valve 101 with fasteners. In one aspect, the fasteners can be screws; however in some aspects, other suitable attachment mechanisms can be used. In another aspect, the actuator can be a manual actuator. Optionally, in various other aspects, the actuator can be a hand wheel, lever, or other manual action mechanism, a pneumatic actuator, electric actuator, or any other desired actuator. In some aspects, the gearbox can be mated to a solenoid motor or a stepper motor, and the valve 101 can be a control valve assembly.

In one aspect, the valve 101 can be a wafer-type valve configured to be installed between a pair of pipe flanges (not shown). In other aspects, the valve can be configured as a lug-type valve or a double-flanged type valve. The body 102 can comprise mounting flanges 114 extending radially outwards from the body outer surface 128 and mounting holes 116 defined in the mounting flanges. In various aspects, the body 102 can comprise any number of mounting flanges 114 and any number of mounting holes 116. In various aspects, bolts or studs (not shown) can pass through the mounting holes 116 to couple the valve 101 between the pipe flanges. In one aspect, the valve can be compressed between the pipe flanges and held in place by the tensioned bolts or studs extending between the flanges. In some aspects such as the lug-type valve or the double-flanged type valve, the valve 101 can be bolted directly to each flange of the pair of flanges. In the present aspect, the body 102 comprises two mounting flanges 114 and twenty-four mounting holes 116; however, in various other aspects, any desired number of mounting flanges 114 and mounting holes 116 can be present.

The rotatable disc 106 of the valve 101 can have a substantially circular shape. In one aspect, the disc can have a first face 140, an opposed second face 142 (shown in FIG. 2), and at least one endwall 144 (shown in FIG. 2) extending therebetween. In the closed position, the first face 140 and the second face 142 can face outward axially away from the valve 101. In one aspect, the disc 106 can define an upper shaft receiving portion 136 and a lower shaft receiving portion 138. In this aspect, the valve 101 can comprise a shaft 212 inserted through the upper neck 108 and valve seat 104 and into the upper and lower shaft receiving portions 136, 138. In use, the shaft 212 can rotatably secure the disc 106 within the bore 131. Optionally, the valve 101 can comprise an upper shaft inserted through the upper neck 108 and valve seat 104 and into the upper and lower shaft receiving portion 136, and a lower shaft inserted through the lower neck and valve seat 104 and into the lower shaft receiving portion 138.

As previously described, the valve element 103 can be positioned within the bore 131 defined by the body 102 and the valve seat 104. A portion of the inner seat surface 133 of the valve seat 104 can define an annular sealing surface 105 configured to form a seal against the valve element 103 in the closed position shown in FIG. 1. In the present aspect, the annular sealing surface 105 can form the seal against a portion of the at least one endwall 144 (shown in FIG. 2) of the disc 106. Additionally, in various aspects, when the outer seat surface 333 of the valve seat 104 mates with the inner body surface 328 of the body 102, a seal can be formed between the valve seat 104 and body 102. Optionally, this seal can be formed around the entire inner body surface 328 of the body 102. In various aspects, when the valve 101 is in the closed position, the seal between the valve seat 104 and the body 102 and the seal between the valve seat 104 and the valve element 103 can prevent the flow of fluid through the valve 101.

The at least one endwall 144 of the disc 106 can comprise a single endwall segment or a plurality of endwall segments, according to one aspect. For example, the endwall 144 can comprise one, two, three, four, five or more than five endwall segments. In another aspect, at least one endwall segment of the plurality of endwall segments can be substantially parallel to the bore axis 134 of the body 102, and/or at least one endwall segment of the plurality of endwall segments can be at an acute angle relative to the bore axis 134 of the body 102. As illustrated in FIGS. 6B and 6C, the endwall 144 can comprise a first endwall segment 144a at a first acute angle relative to the bore axis 134, a second endwall segment 144b substantially parallel to the bore axis 134, and a third endwall segment 144c at a third acute angle relative to the bore axis 134. In this aspect, the endwall segments 144a,b,c can form a taper such that a perimeter 207 of the disc 106 tapers from a first disc width $D_1$ to a second disc width $D_2$ that is less than the first disc width. In a further aspect, the at least one endwall 144 can be substantially linear or arcuate in shape.

The valve seat 104 can be monolithic and can be constructed from a single or continuous piece of material. In one aspect, the valve seat 104 can be constructed from a deformable material such as a polymeric material, a polymeric-lubricant mixture and the like. In some aspects, only the annular sealing surface 105 can be formed from the deformable material. In other aspects, the entire valve seat 104 can be formed from the deformable material. In some of these aspects, the valve seat can be homogenous throughout the entire valve seat. The polymeric material of the valve seat 104 can be ethylene propylene diene monomer ("EPDM") rubber; however, in other aspects, the polymeric material can be a different rubber formulation such as Buna-N, neoprene, nitrile, Viton, silicone rubber or other rubber formulations. In some aspects, the polymeric material can be a natural rubber.

FIG. 2 shows another aspect of the valve 101 similar to the valve of FIG. 1. The top flange 110 can define a mounting surface 210 configured to seal against an actuator or a cover (not shown). The shaft 212 can protrude through the upper neck 108. In the aspect shown, the disc 106 is in the open position allowing fluid to flow through the bore 131. The disc 106 is positioned rotated approximately 90-degrees about the shaft axis from the closed position shown in FIG. 1. In the open position, the endwall 144 of the disc 106 is in minimal contact with the annular sealing surface 105, primarily proximate the upper shaft receiving portion 136 and the lower shaft receiving portion 138.

Figure 3:
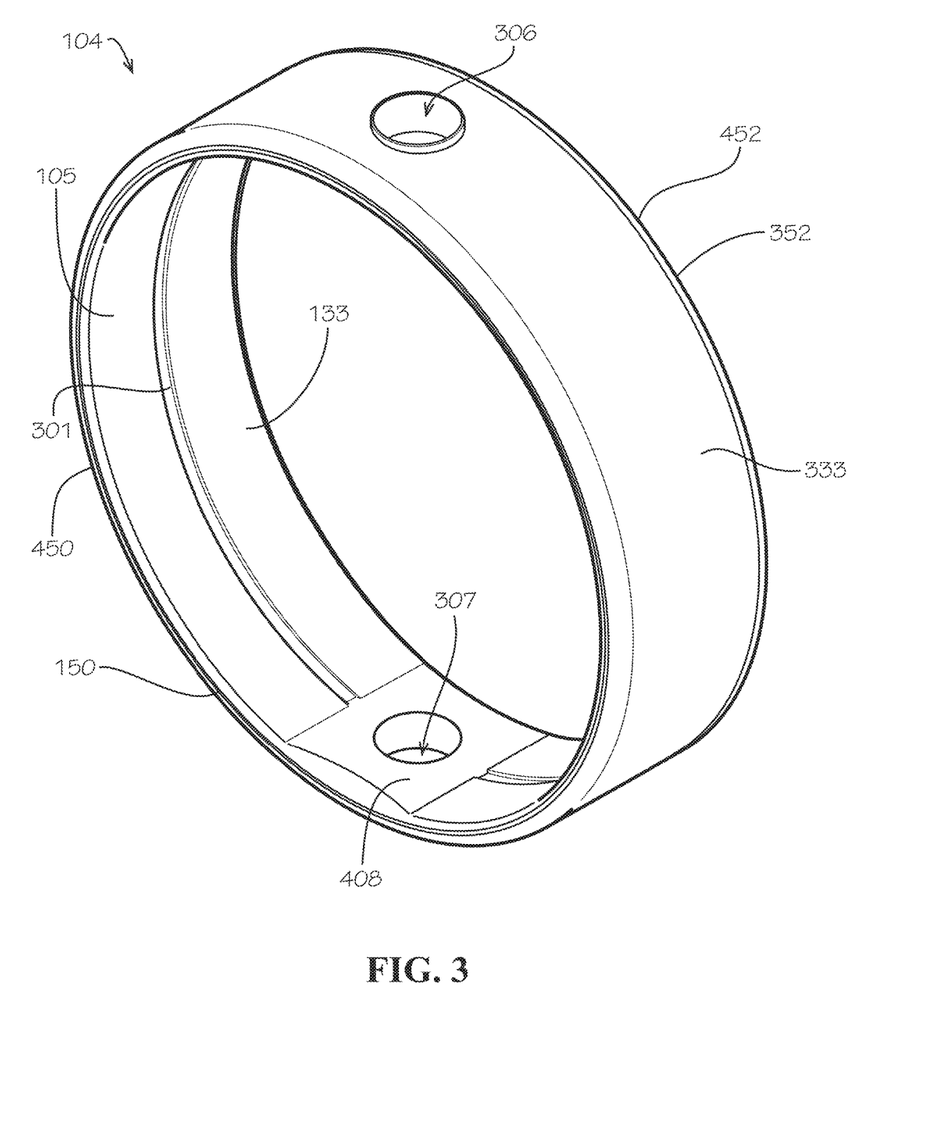
FIG. 3 is a perspective view of a valve seat of the valve of FIG. 1.

FIG. 3 illustrates the valve seat 104 removed from the body 102 of the valve 101, according to one aspect. In some aspects, the valve seat 104 can be permanently epoxied, bonded, or glued to the body 102. The valve seat 104 can define an upper seat hole 306 and a lower seat hole 307 extending through the valve seat 104 from the inner seat surface 133 to the outer seat surface 333. The upper seat hole 306 can be disposed opposite from the lower seat hole 307. The upper seat hole 306 can be configured to seal against an upper journal of the shaft 212 to prevent fluid from entering the upper neck 108 from the bore 131. The lower seat hole 307 can be configured to seal against a lower journal of the shaft 312 to prevent fluid from entering the lower neck from the bore 131.

Figure 4:
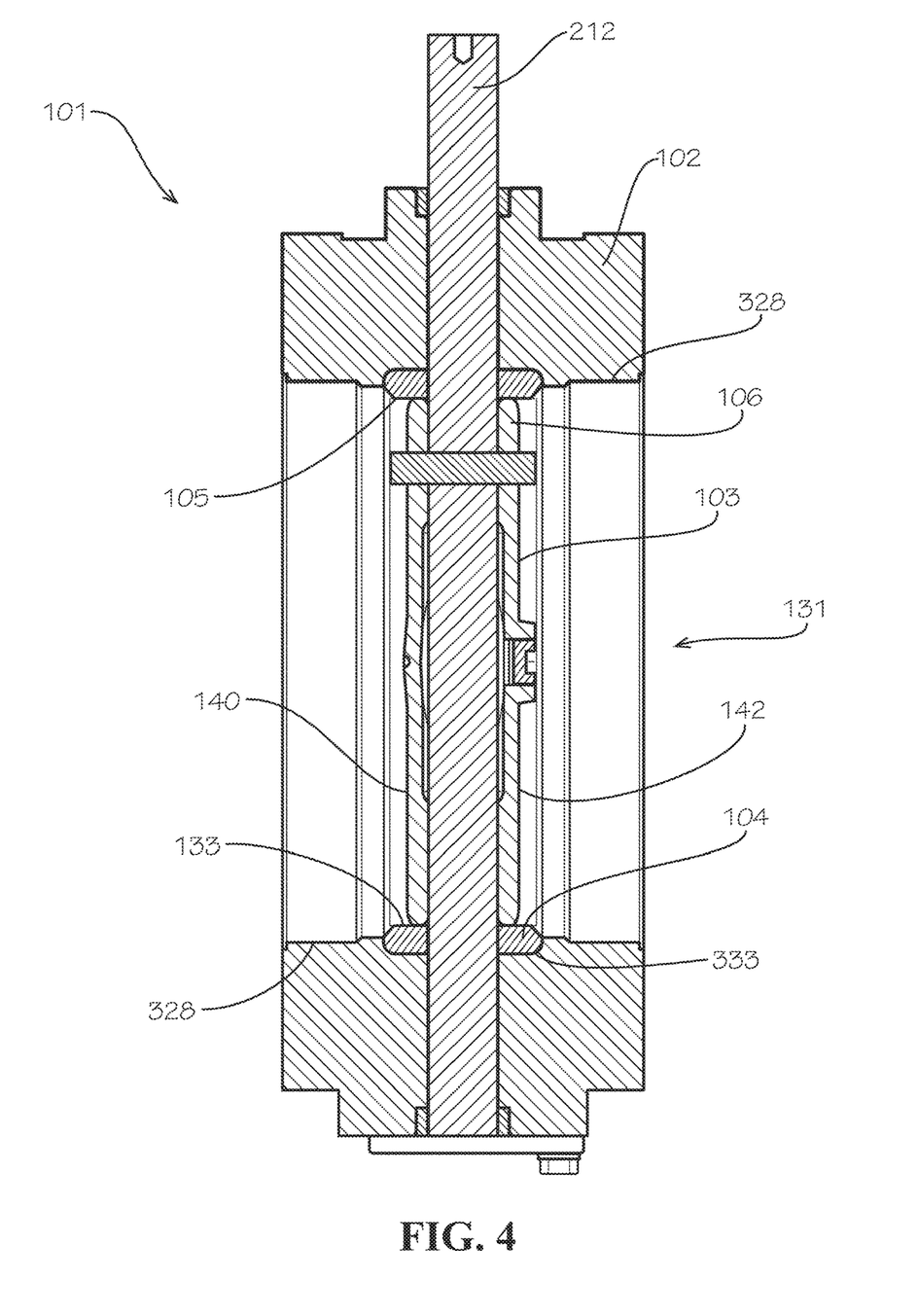
FIG. 4 is a cross-sectional view of the valve of FIG. 1 demonstrating the disc seating against the valve seat and taken along line 4-4 in FIG. 1.

In one aspect, the inner seat surface 133 can define the annular sealing surface 105, a first bevel 450, and a second bevel 452. The annular sealing surface 105 can be disposed between the first bevel 450 and the second bevel 452. The first bevel 450 can be disposed at the first seat end 150, and the second bevel 452 can be disposed at the second seat end 352. The first bevel 450 and the second bevel 452 can provide a transition surface between the inner body surface 328 of the body 102 and the annular sealing surface 105. In some aspects, the transition surfaces can be rounded instead of beveled. The annular sealing surface 105 can form a pair of flat surfaces 408 surrounding the lower seat hole 307 and the upper seat hole 306. The flat surfaces 408 can be configured to reduce interference and friction between the disc 106 and the valve seat 104 when the disc rotates.

An annular groove 301 can be defined in at least a portion of the annular sealing surface 105, according to one aspect. In other aspects, the annular groove 301 can extend around the circumference of the entire annular sealing surface 105, or a portion of the circumference of the annular sealing surface 105. For example, the annular groove 301 can extend around the circumference of the annular sealing surface 105 except for the pair of flat surfaces 408 positioned around the lower seat hole 307 and the upper seat hole 306. In a further aspect, the annular groove 301 can be disposed substantially midway between the first seat end 150 and the second seat end 352. Optionally, the annular groove 301 can be disposed so that in the closed position, the endwall 144 of the disc 106 is positioned substantially in the groove as described more fully below.

Figure 5:
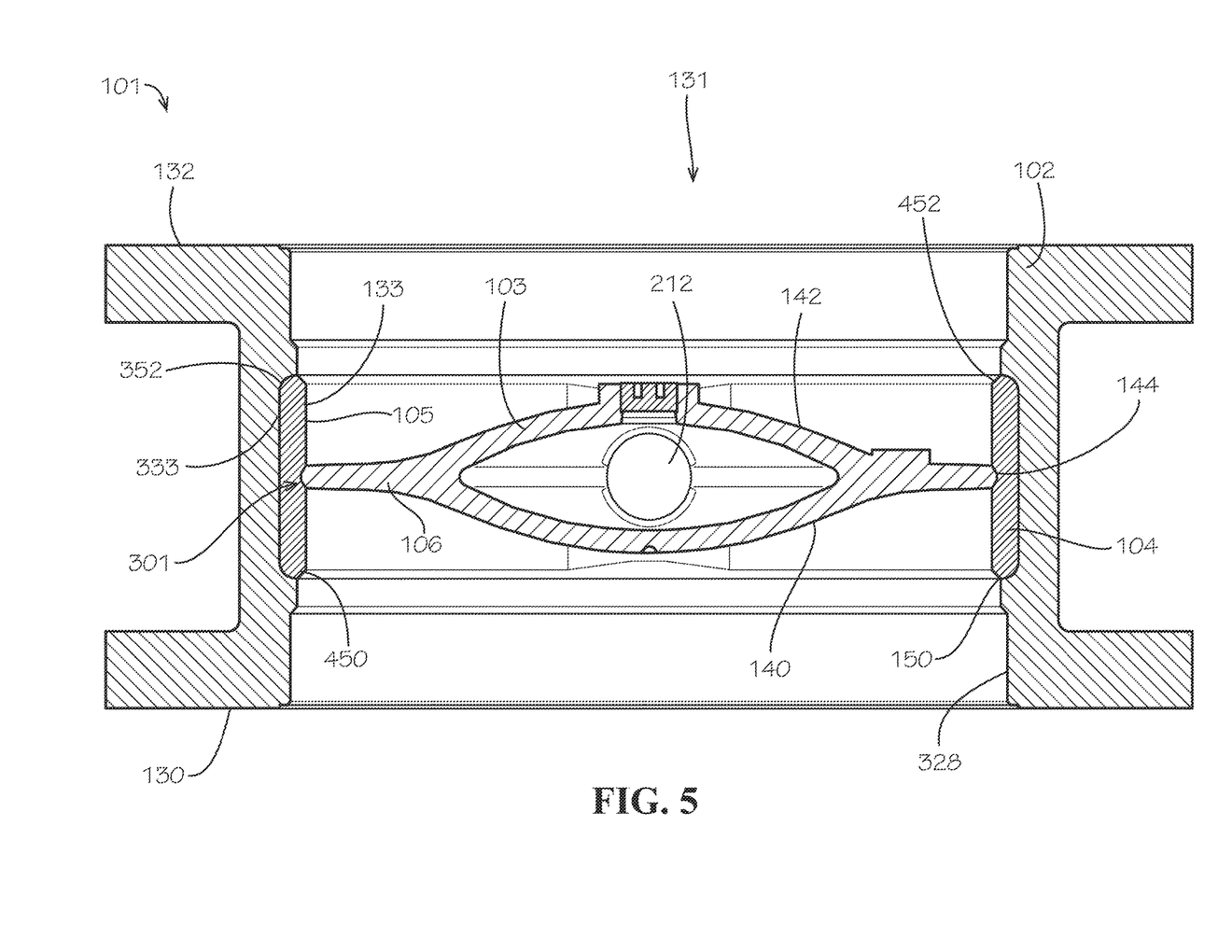
FIG. 5 is a cross-sectional view of the valve of FIG. 1 demonstrating the disc seating against the valve seat and taken along line 5-5 in FIG. 1.

FIG. 4 shows a cross-sectional view of the valve 101 taken from the line 4-4 of FIG. 1 with the body 102 approximately bisected and the disc 106 in the closed position, according to one aspect. In this view, the engagement of the valve element 103, the valve seat 104 and the body 102 can be seen. FIG. 5 shows a cross-sectional view of the valve 101 taken from the line 5-5 of FIG. 1 with the bore 131 approximately bisected and the disc 106 in the closed position, according to one aspect. As illustrated in FIG. 5, the endwall 144 of the disc 106 can be positioned in the annular groove 301 of the annular sealing surface 105 of the valve seat 104.

Figure 6A:
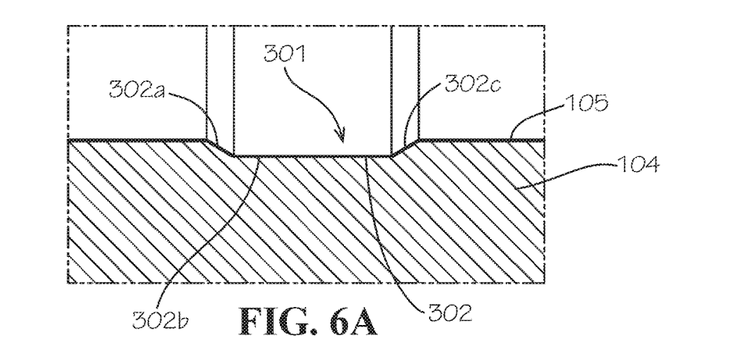
FIG. 6A is cross-sectional view of the valve of FIG. 2 showing an annular groove defined in the valve seat and taken along line 6A-6A in FIG. 2, according to one aspect.
Figure 6B:
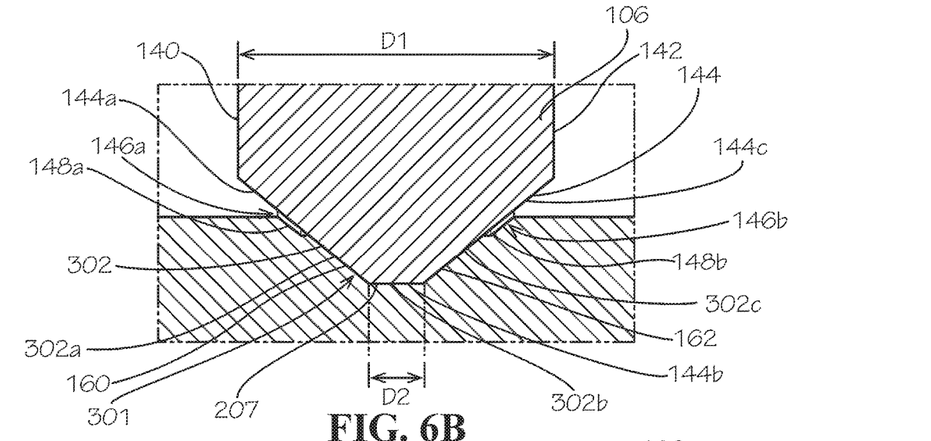
FIG. 6B is an magnified view of the disc and the valve seat of FIG. 1 taken along line 6B-6B in FIG. 1, showing the disc and the valve seat in an unpressurized condition, according to one aspect.
Figure 6C:
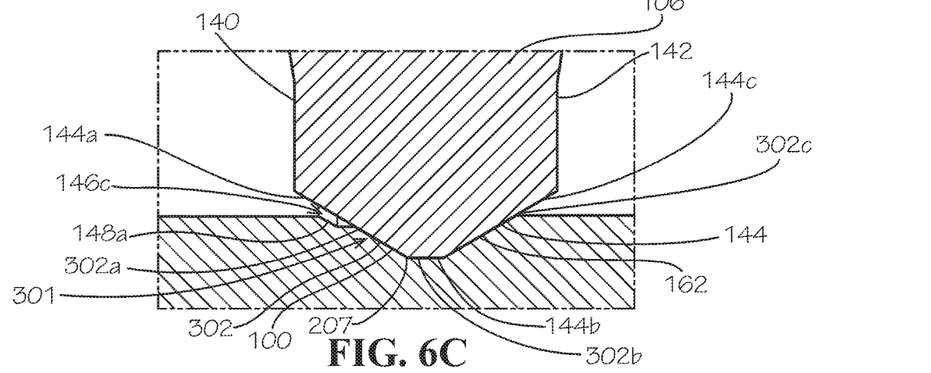
FIG. 6C is an magnified view of the disc and the valve seat of FIG. 1 taken along line 6C-6C in FIG. 1, showing the disc and the valve seat in a pressurized condition, according to one aspect.

FIG. 6A is a magnified cross-sectional view of the annular groove 301 defined in the annular sealing surface 105 of the valve seat 104, according to one aspect. In this aspect, the disc 106 (not shown) is in the open position so that the valve seat 104, the annular sealing surface 105 and the annular groove 301 are in a first, relaxed position. The annular groove 301 can be defined by a groove wall 302. In another aspect, the groove wall 302 can be substantially linear or arcuate in shape.

Optionally, the groove wall 302 can comprise one or a plurality of groove wall segments, such as one, two, three, four, five or more than five groove wall segments. In one aspect, when viewed in cross-section, at least one groove wall segment of the plurality of groove wall segments can be substantially parallel to the annular sealing surface 105, and/or at least one groove wall segment of the plurality of groove wall segments can be at an acute angle relative to the annular sealing surface 105. For example, in the first, relaxed position, the groove wall 302 can comprise a first groove wall segment 302a at a first acute angle relative to the annular sealing surface 105, a second groove wall segment 302b substantially parallel to the annular sealing surface 105, and a third groove wall segment 302c at a third acute angle relative to the annular sealing surface 105. Optionally the first acute angle can be substantially the same as the third acute angle. In another aspect, the second groove wall segment 302b can be positioned between the first groove wall segment 302a and the third groove wall segment 302c In another aspect, the angle of each groove wall segment 302a,b,c can substantially correspond to the angle of each respective endwall segment 144a,b,c of the disc 106. In a further aspect, at least one groove wall segment 302a, b,c can have a greater length than a respective endwall segment 144a,b,c. For example, in the first, relaxed position, the second groove wall segment 302b can have a length greater than a length of the second endwall segment 144b. In another aspect, each groove wall segment 302a,b,c can be substantially the same length. Alternatively, however, at least one groove wall segment 302a,b,c can have a length greater than an adjacent groove wall segment.

FIG. 6B shows the engagement of the endwall 144 of the disc 106 and the annular groove 301 with the valve 100 in a closed and unpressurized condition (i.e., when the disc 106 is closed and fluid pressure exerted on the first face 140 of the disc 106 is substantially the same as fluid pressure exerted on the second face 142 of the disc 106), according to one aspect. In another aspect, an outer diameter of the rotatable disc 106 can be greater than an inner diameter of the groove 301 of the annular sealing surface 105, so that in the closed position, at least a portion of the endwall 144 can contact the groove wall 302 of the groove 301. Because at least a portion of the valve seat 104 is formed from a deformable material, this contact between the endwall 144 and the groove wall 302 can deform or reshape at least one of the valve seat 104, the annular sealing surface 105 and the annular groove 301 from the first, relaxed position to a second, deformed position. In this aspect, in the second, deformed position, a portion of the groove wall 302 can be in contact with the endwall 144, and a portion of the groove wall 302 on each side of the disc 106 can be spaced from the endwall 144 a predetermined distance. In another aspect, in the second, deformed position, a first groove gap 146a having a first gap wall 148a can be defined in the groove 301 on an upstream side 160 of the groove 301 and a second groove gap 146b having a second gap wall 148b can be defined in the groove 301 on a downstream side 162 of the groove 301. That is, the groove 301 can be sized and shaped so that, in the second, deformed position, a groove gap 146a,b can be formed in the groove 301 on each side of the disc. Optionally, a predetermined distance between the endwall 144 of the disc 106 and the gap wall 148a,b can be between about 0.01 to 0.03 inches, or between about 0.012 and 0.019 inches.

In another aspect, with the valve seat 104, the annular sealing surface 105, and/or the annular groove 301 in the second, deformed position, the size, shape and number of groove wall segments 302 can vary relative to the groove wall segments in the first, relaxed position. For example, in the second, deformed position, the groove 301 can be defined by the first gap wall 148a, the first groove wall segment 302a, the second groove wall segment 302b, the third groove wall segment 302c, and the second gap wall 148b. In another example, the angle of the first groove wall segment 302a and third groove wall segment 302c relative to the annular sealing surface 105 can be greater in the second, deformed position than in the first, relaxed position. In still another example, the length of the second groove wall segment 302b can be smaller in the second, deformed position than the length of the second groove wall segment 302b in the first, relaxed position.

FIG. 6C shows the engagement of the at least one endwall 144 of the disc 106 and the annular groove 301 with the valve 100 in a closed and pressurized condition (i.e., when the disc 106 is closed and fluid pressure exerted on the first face 140 of the disc 106 is greater than fluid pressure exerted on the second face 142 of the disc 106, such as when there is pump-pressurized water on the upstream side 160 of the disc 106 and there is air or unpressurized water on a downstream side 162 of the disc 106), according to one aspect. As fluid pressure is being exerted on a face 140, 142 of the disc 106, the fluid pressure can push the entire disc 106 or bow the disc 106 so that the perimeter 207 of the disc is urged away from the fluid pressure. That is, the fluid pressure can either push the whole disc 106 or bend or flex a portion of the disc 106 away from the fluid pressure. Because the valve seat 104 is formed from a deformable material, this bending of the disc 106 away from the fluid pressure (and therefore further into contact with a portion of the groove wall 302) can deform or reshape at least one of the valve seat 104, the annular sealing surface 105 and the annular groove 301 to a third, deformed position.

In the third, deformed position, a portion of the groove wall 302 can be in contact with the endwall 144, and a portion of the groove wall 302 on the upstream side 160 or the side of the groove 301 closest to the fluid pressure can be spaced from the endwall 144 a predetermined distance. In this aspect, the groove wall 302 on the downstream side 162 or the side of the groove 301 farthest from the fluid pressure can be in contact with the endwall 144. In another aspect, in the third, deformed position, a third groove gap 146c having a third gap wall 148c can be defined in the groove 301 on the upstream side 160 of the groove 301. That is, the groove 301 can be sized and shaped so that, in the third, deformed position, the third groove gap 146c can be formed in the groove 301 on the upstream side 160 of the groove 301. In this aspect, a volume of the third groove gap 146c can be greater than a volume of the first groove gap 146a and a volume of the second groove gap 146b. Thus, the third groove gap 146c of the third, deformed position can be a larger groove gap than the first groove gap 146b or the second groove gap 146b of the second, deformed position. Optionally, a predetermined distance between the endwall 144 of the disc 106 and the third gap wall 148c can be between about 0.01 to 0.03 inches, or between about 0.012 and 0.019 inches. In another aspect, on the downstream side 162 of the groove 301, the groove wall 302 can contact the endwall 144 of the disc 106 without formation of a groove gap 146. That is, in the third, deformed position, the third groove wall segment 302c can contact the third endwall segment 144c for the entire length of the third groove wall segment 302c.

As can be seen in FIG. 6C, in the third, deformed position, no groove gap is defined in the groove 301 adjacent to the second disc face 142. In one aspect, as the groove 301 transitions from the second, deformed position to the third, deformed position, the volume of the second groove gap 146b (formed on the downstream side 162 of the groove 301 in the second, deformed position) decreases as fluid pressure urges the second face 142 of the disc 106 further into contact with third groove wall segment 302c of the groove wall 302 until the volume of the second groove gap 146b in the third, deformed position is substantially zero. That is, in the third, deformed position, there is no groove gap defined in the groove 301 on the downstream 162 side of the disc 106 and a secondary seal can be formed due to the contact between the second face 142 of the disc 106 and the third groove wall segment 302c of the groove 301.

In still another aspect, with the valve seat 104, the annular sealing surface 105, and/or the annular groove 301 in the third, deformed position, the size, shape and number of groove wall segments 302 can vary from the groove wall segments in the second, deformed position. For example, in the third, deformed position, the groove 301 can be defined by the third gap wall 148*c*, the first groove wall segment 302*a*, the second wall segment 302*b*, and the third wall segment 302*c*.

During operation of the valve 101, torque can be transmitted through the shaft 212 to the disc 106 in order to rotate the disc 106. In the present aspect, when moving the disc 106 to the closed position (illustrated in FIG. 1), the disc 106 can be rotated in a first direction (either clockwise or counter-clockwise) to seat the disc 106 against the valve seat 104. In the closed position, the endwall 144 of the disc 106 can engage a portion of the groove wall 302 to form a primary seal between the disc 106 and the groove 301 defined in the annular sealing surface 105. For example, the second endwall segment 144*b* of the disc 106 can frictionally engage the second groove wall segment 302*b* of the groove 301 to form a primary seal that restricts or prevents fluid from flowing through the valve 101.

In one aspect, with the disc 106 in the closed position or near to the closed position, pressure exerted by fluid positioned in the bore 131 can urge the disc 106 to form a secondary seal in addition to the primary seal. For example, fluid pressure can urge disc 106 so that a portion of the endwall 144 of the disc 106 is moved towards and engages a portion of the groove wall 302 on the downstream side 162 of the disc 106 away from the fluid. The secondary seal can then be formed between a portion of the side of the disc 106, such as the third endwall segment 144*c* and the side of the groove 301, such as the third groove wall segment 302*c*.

In the present aspect, when moving the disc 106 towards the open position (illustrated in FIG. 2), the disc can be rotated in a second direction that is opposed to the first direction to unseat the disc 106 from the valve seat 104. When moved from the closed position, the endwall 144 of the disc 106 disengages the groove 301 to break the seal between the disc and the annular sealing surface 105.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
   an annular body defining a body bore having a bore axis;
   an annular valve seat positioned in the body bore and sealed to the annular body, wherein the annular valve seat comprises an annular sealing surface that defines a seat bore, wherein an annular groove is defined in the annular sealing surface by a groove wall, the annular groove circumferentially extending around the bore axis, and wherein the annular sealing surface is formed from a deformable material;
   a valve element positioned in the seat bore and coupled to the annular body, the valve element comprising a rotatable disc configured to rotate about and between a closed position, in which the rotatable disc is configured to prevent fluid from flowing through the seat bore, and an open position, in which the rotatable disc is configured to allow maximum fluid flow through the seat bore, wherein the rotatable disc has a first disc face, and an opposed second disc face,
   wherein in the open position, the annular groove is in a first, relaxed position,
   wherein in the closed position and an unpressurized condition, in which fluid pressure exerted on the first face of the rotatable disc is substantially the same as fluid pressure exerted on the second face of the rotatable disc, the annular groove is in a second, deformed position that is different than the first, relaxed position, wherein a first groove gap is defined in the annular groove adjacent to the first disc face and wherein a second groove gap is defined in the annular groove adjacent to the second disc face,
   wherein in the closed position and a pressurized condition, in which fluid pressure exerted on the first face of the rotatable disc is different than fluid pressure exerted on the second face of the rotatable disc, the annular groove is in a third, deformed position that is different than the second, deformed position and a third groove gap is defined in the annular groove adjacent to the first disc face, wherein a volume of the third groove gap is greater than a volume of the first groove gap of the second, deformed position and wherein the volume of the third groove gap is greater than a volume of the second groove gap of the second, deformed position.

2. The valve of claim 1, wherein in the third, deformed position, no groove gap is defined in the annular groove adjacent to the second disc face.

3. The valve of claim 1, wherein in the third, deformed position, the volume of the second groove gap is zero.

4. The valve of claim 1, wherein, in the first, relaxed position, the annular groove is defined by a first groove wall segment at an acute angle relative to the annular sealing surface, a third groove wall segment at an acute angle relative to the annular sealing surface, and a second groove wall segment positioned between the first groove wall segment and the third groove wall segment, the second groove wall segment being substantially parallel to the annular sealing surface.

5. The valve of claim 4, wherein, in the second, deformed position the annular groove is defined partially by the first groove wall segment at an acute angle relative to the annular sealing surface, the third groove wall segment at a third acute angle relative to the annular sealing surface, and the second groove wall segment positioned between the first groove wall segment and the third groove wall segment, the second groove wall segment being substantially parallel to the annular sealing surface, and wherein the length of the second groove wall segment in the first, relaxed position is greater than the length of the second groove wall segment in the second, deformed position.

6. The valve of claim 1, wherein the rotatable disc has an endwall extending therebetween the first disc face and the second disc face and wherein the endwall comprises a second endwall segment that is substantially parallel to the bore axis.

7. The valve of claim 6, wherein in the third, deformed position, the annular groove is partially defined by a second groove wall segment that is substantially parallel to the annular sealing surface, and wherein frictional engagement between the second groove wall segment and the second endwall segment of the rotatable disc forms a primary seal that restricts fluid from flowing through the seat bore of the valve.

8. The valve of claim 7, wherein in the third, deformed position, the annular groove is partially defined by a third groove wall segment that is adjacent to the second groove wall segment and at a third acute angle relative to the annular sealing surface, and wherein frictional engagement between the third groove wall segment and the second face of the rotatable disc forms a secondary seal that restricts fluid from flowing through the seat bore of the valve.

9. The valve of claim 1, wherein, in the second, deformed position, the annular groove is defined by a first gap wall of the first gap, a first groove wall segment adjacent to the first gap wall and at an acute angle relative to the annular sealing surface, a second groove wall segment adjacent to the first groove wall segment and substantially parallel to the annular sealing surface, a third groove wall segment adjacent to the second groove wall segment and at an acute angle relative to the annular sealing surface and a second gap wall of the second gap.

10. The valve of claim 9, wherein, in the third, deformed position, the annular groove is defined by a third gap wall of the third gap, the first groove wall segment adjacent to the third gap wall and at an acute angle relative to the annular sealing surface, the second groove wall segment adjacent to the first groove wall segment and substantially parallel to the annular sealing surface, and the third groove wall segment adjacent to the second groove wall segment and at an acute angle relative to the annular sealing surface.

11. A butterfly valve comprising:
an annular body defining a body bore having a bore axis;
an annular valve seat positioned in the body bore and sealed to the annular body, wherein the annular valve seat comprises an annular sealing surface that defines a seat bore, wherein an annular groove is defined in the annular sealing surface by a groove wall, the annular groove circumferentially extending around the bore axis;
a disc positioned in the seat bore and coupled to the annular body, the disc configured to rotate about and between a closed position, in which the disc is configured to prevent fluid from flowing through the seat bore, and an open position, in which the disc is configured to allow maximum fluid flow through the seat bore, wherein the disc has a first disc face, an opposed second disc face, and an endwall extending therebetween the first disc face and the second disc face,
wherein in the closed position and a pressurized condition, in which fluid pressure exerted on the first face of the disc is different than fluid pressure exerted on the second face of the disc, a primary seal is formed between a first portion of the endwall of the disc and the groove wall and a secondary seal is formed between a second portion of the endwall of the disc and the groove wall, and wherein first portion of the endwall is at an acute angle relative to the second portion of the endwall.

12. The valve of claim 11, wherein the first portion of the endwall is substantially parallel to the bore axis.

13. The valve of claim 11, wherein the annular valve seat is formed from a deformable material and wherein in the open position, the annular groove is in a first, relaxed position.

14. The valve of claim 13, wherein in the closed position and an unpressurized condition, in which fluid pressure exerted on the first face of the disc is substantially the same as fluid pressure exerted on the second face of the disc, the annular groove is in a second, deformed position that is different than the first, relaxed position.

15. The valve of claim 11, wherein in the closed position and an unpressurized condition, in which fluid pressure exerted on the first face of the disc is substantially the same as fluid pressure exerted on the second face of the disc, a first groove gap is defined in the annular groove adjacent to the first disc face and a second groove gap is defined in the annular groove adjacent to the second disc face.

16. The valve of claim 15, wherein in the closed position and a pressurized condition, in which fluid pressure exerted on the first face of the disc is different than fluid pressure exerted on the second face of the disc, a third groove gap is defined in the annular groove adjacent to the first disc face, wherein a volume of the third groove gap is greater than a volume of the first groove gap and wherein the volume of the third groove gap is greater than a volume of the second groove gap.

17. The valve of claim 16, wherein in the in the closed position and the pressurized condition, no groove gap is defined in the annular groove adjacent to the second disc face.

18. The valve of claim 16, wherein in the closed position and the pressurized condition, the volume of the second groove gap is zero.

* * * * *